US012307100B1

(12) United States Patent
Neelannavar et al.

(10) Patent No.: US 12,307,100 B1
(45) Date of Patent: May 20, 2025

(54) DATA STORAGE DEVICE AND METHOD FOR MANAGING MEMORY MAINTENANCE OPERATIONS

(71) Applicant: Western Digital Technologies, Inc., San Jose, CA (US)

(72) Inventors: Savita H Neelannavar, Bangalore (IN); Kishore Kumar Konapala, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/441,095

(22) Filed: Feb. 14, 2024

(51) Int. Cl.
*G06F 3/06* (2006.01)
*G06F 12/02* (2006.01)
*G06F 13/16* (2006.01)

(52) U.S. Cl.
CPC .......... *G06F 3/0619* (2013.01); *G06F 3/0659* (2013.01); *G06F 3/0679* (2013.01); *G06F 12/0246* (2013.01); *G06F 13/1694* (2013.01); *G06F 2212/7205* (2013.01)

(58) Field of Classification Search
None
See application file for complete search history.

(56) References Cited

U.S. PATENT DOCUMENTS

| | | | | |
|---|---|---|---|---|
| 7,315,917 | B2* | 1/2008 | Bennett | G06F 12/0246 711/100 |
| 7,441,071 | B2* | 10/2008 | Traister | G06F 12/0246 711/165 |
| 8,341,300 | B1* | 12/2012 | Karamcheti | G06F 13/1642 710/52 |
| 8,504,784 | B2* | 8/2013 | Traister | G06F 12/0246 711/158 |
| 8,751,699 | B1* | 6/2014 | Tsai | G06F 3/0689 710/17 |
| 2011/0141788 | A1* | 6/2011 | Balakrishnan | B82Y 10/00 365/51 |
| 2019/0243773 | A1* | 8/2019 | Li | G06F 12/0246 |
| 2020/0409562 | A1* | 12/2020 | Navon | G06F 12/0246 |

OTHER PUBLICATIONS

Culler et al. Parallel Computer Architecture. Aug. 1997. Morgan Kaufmann. p. 44.*

* cited by examiner

*Primary Examiner* — Nathan Sadler
(74) *Attorney, Agent, or Firm* — Crowell & Moring LLP

(57) ABSTRACT

A data storage device can perform memory maintenance operations to maintain a healthy state of its memory. It is sometimes required to perform memory maintenance operations as foreground operations, but performing such operations in the foreground may exceed a time constraint established to guarantee a certain performance level. In one embodiment, the data storage device can throttle host commands to allow the memory maintenance operations to be performed in the foreground within the time constraint. Other embodiments are provided.

16 Claims, 8 Drawing Sheets

DATA STORAGE DEVICE AND METHOD FOR MANAGING MEMORY MAINTENANCE OPERATIONS

BACKGROUND

A data storage device has a memory in which it stores data. In addition to storing data in and retrieving data from the memory in response to a command from a host, the data storage device can perform memory maintenance operations to maintain a healthy state of the memory. Performing these memory maintenance operations in the foreground during a host read/write operation can reduce the guaranteed peak performance of the memory. Performing these memory maintenance operations in the background can avoid this problem, but the data storage device may disable background operations to conserve power.

DETAILED DESCRIPTION

The following embodiments generally relate to a data storage device and method for managing memory maintenance operations. In one embodiment, a data storage device is provided comprising a memory and one or more processors. The one or more processors, individually or in combination, are configured to determine whether a set of memory maintenance operations can be performed within a time constraint; and in response to determining that the set of memory maintenance operations cannot be performed within the time constraint: throttle host commands received by the data storage device to allow the set of memory maintenance operations to be performed within the time constraint; and perform the set of memory maintenance operations within the time constraint.

In another embodiment, a method is provided that is performed in a data storage device comprising a memory. The method comprises: determining whether a set of memory maintenance operations can be performed within a time period; and in response to determining that the set of memory maintenance operations cannot be performed within the time period: throttling input-output commands received by the data storage device to allow the set of memory maintenance operations to be performed within the time period; and performing the set of memory maintenance operations within the time period.

In yet another embodiment, a data storage device is provided comprising: a memory; and means for throttling host commands to allow a set of memory maintenance operations to be performed in the memory in a foreground within a time constraint.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1A:
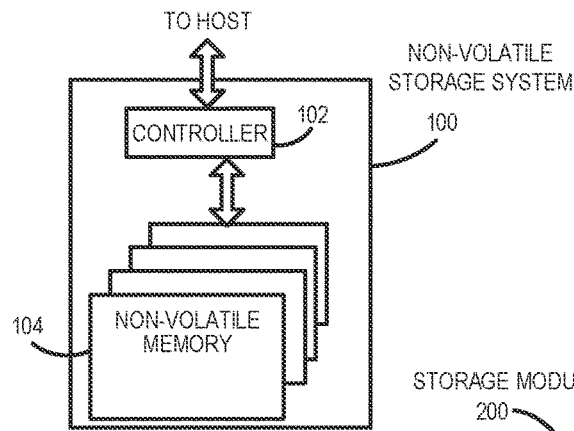
FIG. 1A is a block diagram of a data storage device of an embodiment.
Figure 1B:
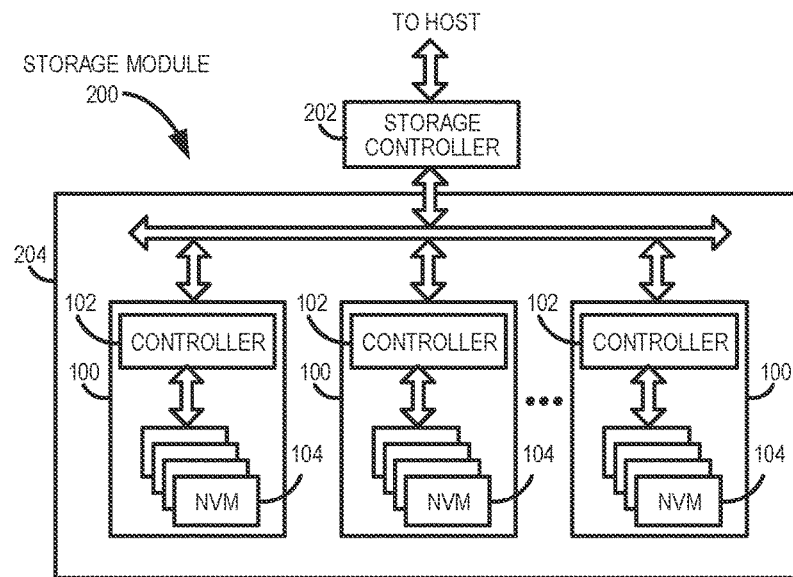
FIG. 1B is a block diagram illustrating a storage module of an embodiment.
Figure 1C:
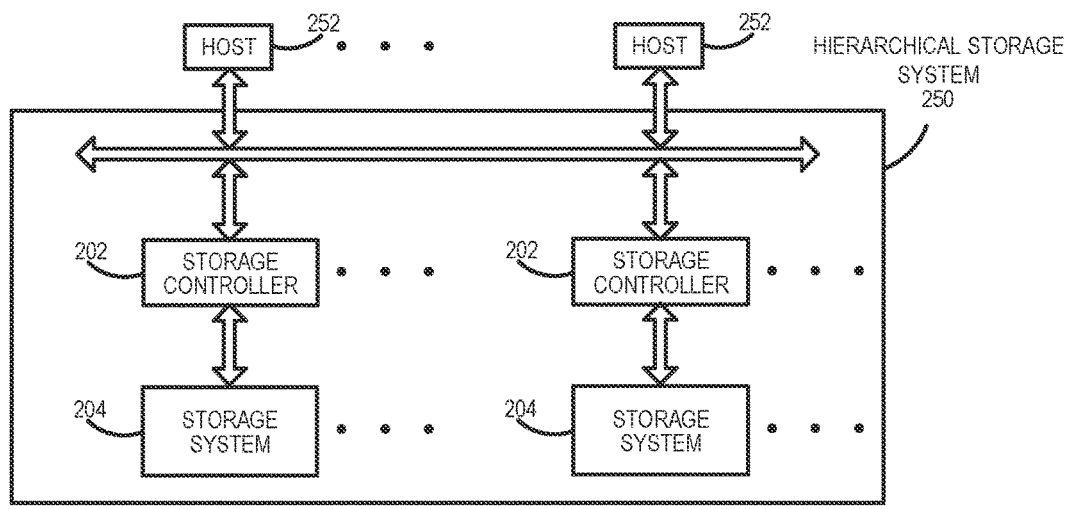
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
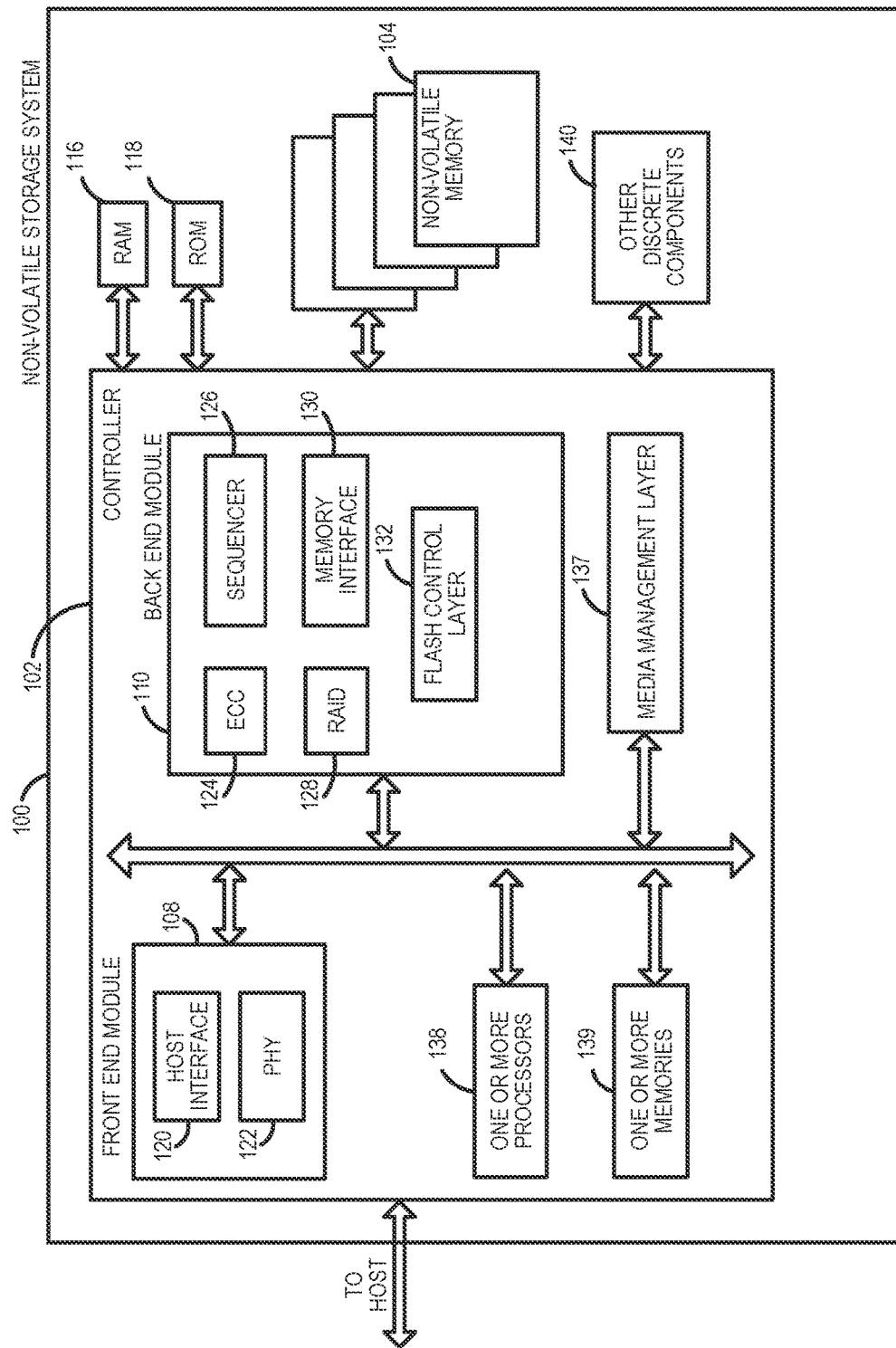
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 137 and buffer management/bus controller 114 are optional components that are not necessary in the controller 102.

Figure 2B:
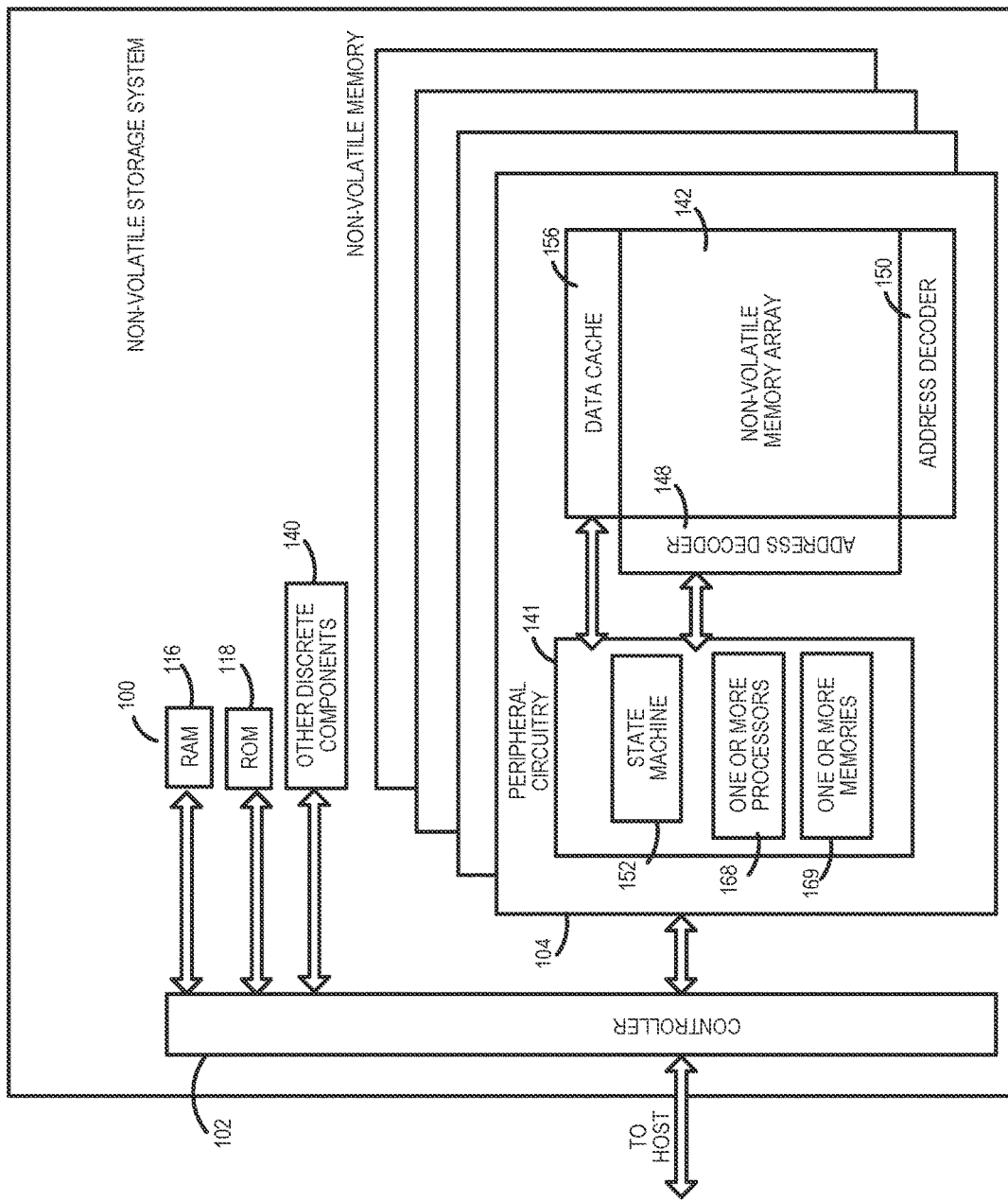
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the NAND media. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
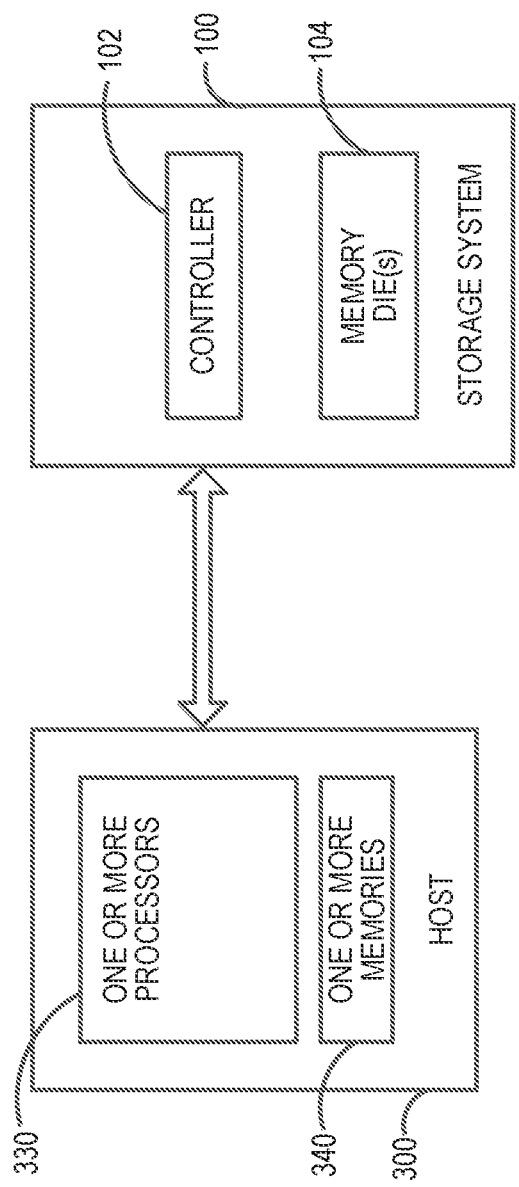
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

In addition to retrieving data from or storing data in the memory 104 in response to read/write command from the host 300, the controller 102 of the data storage device 100 can perform a set of (i.e., one or more) memory maintenance operations (i.e., read/write operations apart from those initiated for host read/write) to maintain a healthy state of the memory 104. Examples of such memory maintenance operations include, but are not limited to, read scrub operations, enhanced post-write read (EPWR) operations, single-level cell (SLC) to multi-level cell (MLC) relocation operations, internal file system (IFS)) block management operations, wear leveling operations, and garbage collection operations.

Performing memory maintenance operations in the foreground during a host read/write operation can reduce the guaranteed peak performance of the memory 104. Performing these maintenance operations in the background can avoid this problem, but the data storage device 100 may disable background operations to conserve power, especially if the data storage device 100 is a power-sensitive product. For example, the data storage device 100 can be put in sleep mode within five milliseconds of inactivity by the host 300 to save power. Hence, there is not much opportunity to perform background operations.

Figure 4:
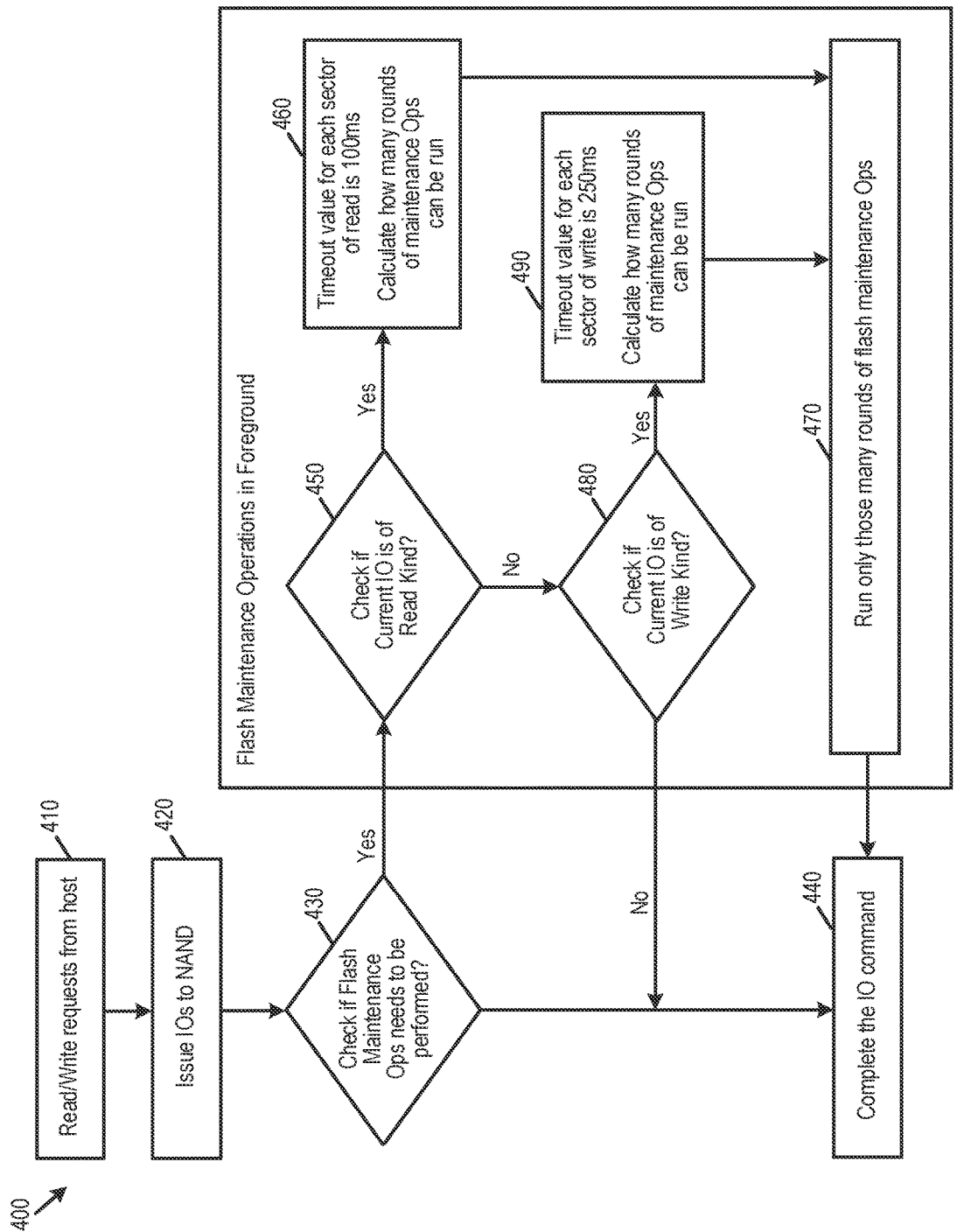
FIG. 4 is a flow chart of a method of an embodiment for perform a memory maintenance operation as a foreground operation.

FIG. 4 is a flow chart 400 of a method of an embodiment for performing a memory maintenance operation as a foreground operation. As shown in FIG. 4, in response to receiving read/write requests from the host 300 (act 410), the controller 102 issues input-output (IO) commands to the memory 104 (in this example, NAND) (act 420). The controller 102 then checks if memory management operations (in this example, Flash memory management operations) need to be performed (act 430). If memory management operations do not need to be performed, the controller 102 completes the IO command (act 430).

However, if the memory management operations do need to be performed, memory maintenance operations are performed in the foreground. First, the controller 102 checks if the current IO is a read (act 450). If the current IO is a read, the controller 102 sets a timeout value for each sector of read, in this example, to 100 ms and calculates how many rounds of memory maintenance operations can be run (act 460). Then, the controller 102 runs only those many rounds of memory maintenance operations (act 470), after which the controller 102 completes the IO command (act 440). If the current IO is not a read, the controller 102 checks if the current IO is a write (act 480). If the current IO is a write, the controller 102 sets the timeout value for each sector of the write to 250 ms and calculate how many rounds of memory maintenance operations can be run (act 490). Then, the controller 102 runs only those many rounds of memory maintenance operations (act 470), after which the controller 102 complete the IO command (act 440).

A data storage device may be designed on single-core platform, where read or write operation occurs one after the other. In some protocols (e.g., the SD protocol), unless one command completes, the next command cannot be submitted. So, a single-core design may suit the requirements of such protocols. However, in multi-protocol data storage devices that support multiple protocols (e.g., SD and NVMe protocols), the platform design is a multi-core system and may need to meet very-high performance requirements. Since the NVMe protocol does not mandate strict timing constraints and draws more power compared to SD data storage devices, a multi-core system can be designed to do memory maintenance operations in the background, where the background operations are spread across a few cores.

When such multi-protocol data storage devices switch to SD mode, there is a challenge to do memory maintenance operations in the foreground. Since more than one core is involved in doing memory maintenance operations, it may require special care to do memory operations in the foreground by multi-cores with synchronization between then and still meet the SD protocol strict timing constraints. That is, since SD data storage devices are very tight on power consumption, all the memory maintenance operations are performed in the foreground during IO operations. However, there may be a pile-up of many memory maintenance operations, which further reduces overall peak performance of IO operations.

The following embodiments can be used to address this situation by performing memory maintenance operations in the foreground with help of the host 300. In one embodiment, the controller 102 of the data storage device 100 notifies the host 300 when a priority memory management operation (e.g., an urgent garbage collection operation) is pending to buy some time with the host 300 to perform these memory management operations in the foreground to improve performance.

Figure 5:
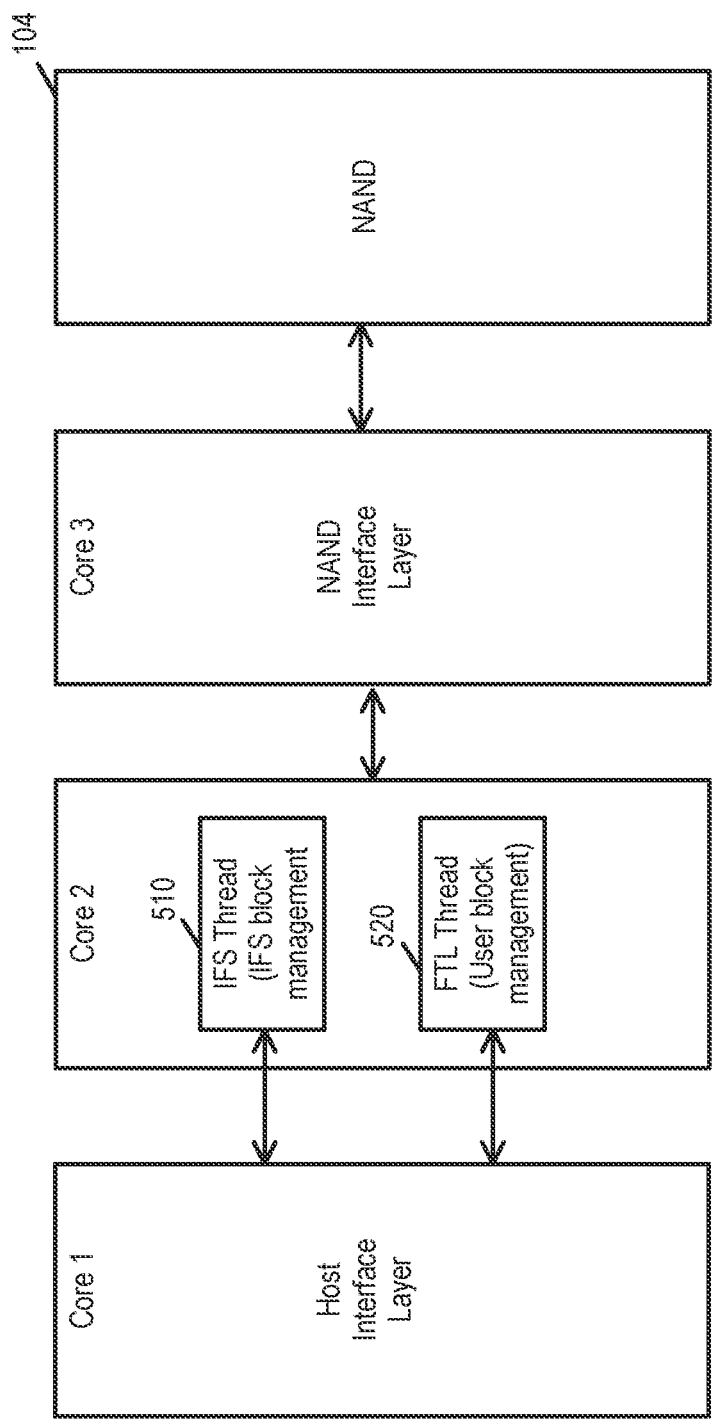
FIG. 5 is an illustration of a multi-core memory architecture of an embodiment.

FIG. 5 is an illustration of a multi-core memory architecture of one example implementation of a data storage device of an embodiment. As shown in FIG. 5, there are three cores in the example architecture. Core 1 is a host interface layer, which is the front-end thread. Core 2 is comprises an internal file system (IFS) thread 510 for block management and an flash translations layer (FTL) thread 520 for user block management. Core 3 is the NAND interface layer and is in communication with the NAND memory die(s) 104.

In this example implementation, the background operations that are handled by the FTL thread 520 include read scrub, EPWR, SLC-to-MLC relocation, and wear leveling. This will handle both user block and meta block management. Regarding the IFS thread 510, boot blocks (e.g., eight blocks) can be important blocks that store information about boot code, critical ROM data (e.g., boot page, flash ID, etc.) and details about internal file system (IFS) blocks. In this example, there is a dedicated thread 510 to operate on these IFS blocks. IFS blocks are partitioned majorly into a code partition and an active partition. The code partition holds information about all code files, which are infrequently written. The active partition holds all the active files that can be written frequently, such as configuration data. Since reads and writes of these blocks happen, there is always chance that memory maintenance operations can get triggered in these blocks.

In one example, for any uncorrectable error correction code (UECC)/EF/PF/high bit error rate (BER)/wear levelling/read scrub on IFS blocks (e.g., IFS blocks and boot blocks), the IFS thread 510 can relocate the failed blocks to a fresh block, thus avoiding further errors on the new block. These operations running on IFS blocks will be referred to herein as "IFS Compaction." Since these file system blocks hold critical data for the device's boot up and operational-related data, these data blocks are typically SLC in nature. These expect less failures, and, hence, it can be very important to re-locate the data from an error block to a healthy block.

When a multi-core system gets switched to operate in SD mode, the challenge can be to perform memory maintenance operations in both the threads and still meet the strict timings of the SD protocol. In one embodiment, this can be accomplished by handling foreground operations during IOs only. In this embodiment related to handling foreground operations during IOs only, the controller 102 can have a module referred to herein as an SD Buffer Management Module (SDBM) module, which can implement an SD buffer throttling feature. The SDBM throttling enables the controller 102 to add precise delays between sectors during host transfers. In other words, host transfer (read or write) speeds can be precisely controlled using this throttling feature of the SDBM module. This module can be configured when the controller 102 needs to buy time to do foreground memory maintenance operations. Basically, data transfer speed from host buffer into the data storage device's buffer can be delayed, so that the controller 102 can get some time to perform the memory management operations. On a multi-core platform operating in SD mode, if memory maintenance operations are required across multiple threads or cores, proper synchronization can be made along with some throttling time. Within this throttled time, some fixed/calculated cycles of memory maintenance operations can be executed.

Figure 6:
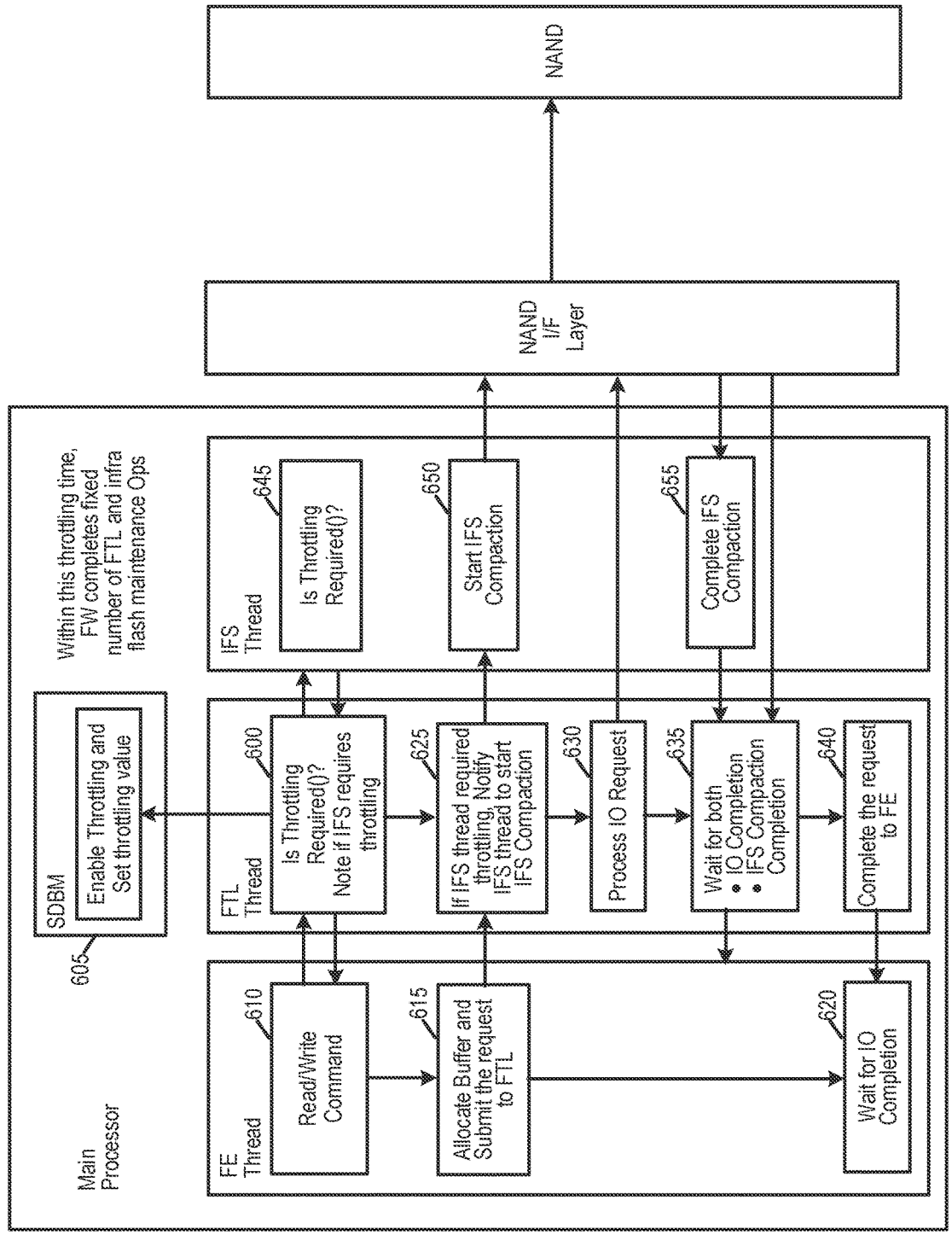
FIG. 6 is an illustration of a multi-core memory architecture of an embodiment.

FIG. 6 is a diagram of an example implementation of this embodiment. In this embodiment, IFS compaction is handled by the IFS thread and user and meta block management done by the FTL thread, in which both require that memory maintenance operations be done. They also synchronize to meet timing requirements of the SD protocol. More specifically, as shown in FIG. 6, when the front end (FE) thread (e.g., the host interface layer) receives a read/write command (act 610), it allocates a buffer and submits the request to the FTL thread (act 615), after which it waits for IO completion (act 620). In parallel, the FTL thread determines if throttling is required (act 600). This is done by inquiring to the IFS thread whether it required throttling (act 645). If the IFS thread requested throttling, the IFS thread is notified to start IFS compaction (act 625), and the IFS thread starts IFS compaction (act 650). The FTL thread then processes the IO request (act 630) and waits for both IO completion and IFS compaction completion (act 635), where IFS completion would be indicated by the IFS thread (act 655). When both completions are received, the FTL thread informs the FE thread on the completion (act 640).

Figure 7:
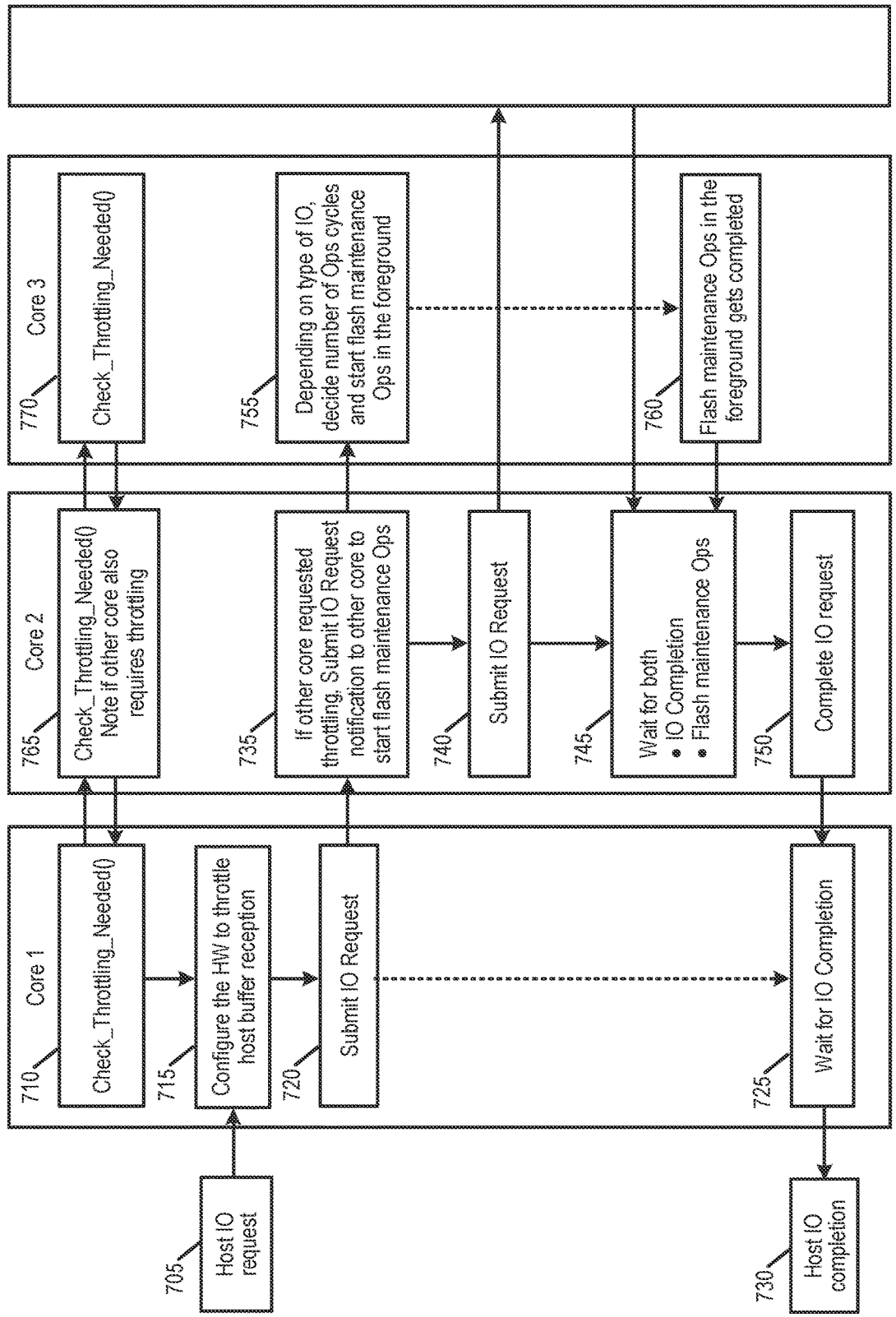
FIG. 7 is an illustration of a multi-core memory architecture of an embodiment.

FIG. 7 is a diagram of another multi-core platform implementation where Core 1 is the front end (FE) interface, Core 2 is the flash translation layer (FTL), Core 3 is the IFS layer managing IFS blocks, and Core 4 is the physical storage layer, which interacts with the memory. In this example, Core 2 and Core 3 both do foreground memory maintenance operations. More specifically, in response to receiving a host IO request (act 705), Core 1 checks with Core 2 if throttling is needed (act 710), Core 2 checks with Core 3 if throttling is needed (act 765), Core 3 checks if throttling is needed (act 770) within itself. If throttling is required by any of the Cores, Core1 configures the hardware to throttle host buffer reception (act 715), submits an IO Request (act 720), and waits for IO completion (act 725). Core 2 on getting IO request, checks if next Core has requested throttling (act 735), if yes, sends indication to Core 3 to starts its flash maintenance operations (act 755). After indicating to Core 3, Core 2 will handle IO command and submit it to Core 4 (act 740). Core 2 will wait for IO completion as well as flash Ops completion from Core 3 (act 745). Once Core 2 gets completion from IO and flash Ops completion (act 760), Core 2 will complete IO request from itself (act 750). Core 1 waiting at (act 725) will be over and then it sends an IO completion to the host (act 730).

As can be seen from the above, in this example, when the host sends an IO command, the IO command is handled by the FE interface (Core 1). Since the FE interface has access to the SD controller's SDBM module, it will check with Core 2 if the FE interface needs to configure the SDBM for throttling. Since foreground operations are handled by Core 2 and Core 3, Core 2 will further check with Core 3 if Core 3 needs to perform foreground memory maintenance operations. Core 2 will note if Core 3 also needs foreground operations and will indicate the same to the FE interface. In case of an SD read, each sector needs to be completed within 100 ms, and, in case of write, each sector needs to complete within 250 ms. Depending on cycles of foreground memory maintenance operations to be performed, throttling time can also be indicated by Core 2 back to the FE interface. The FE interface can configure the SDBM for throttling accordingly and submit the IO request to Core 2. Core 2 will then submit a "perform foreground ops" request to Core 3, so that Core 3 can start its memory maintenance operations (here, iFS Compaction). Core 2 will start its IO operations and also some calculated number of foreground operations. Once Core 2 completes its operations, it will wait for Core 3 to complete a fixed number of IFS compactions. Once both the Cores are done processing the IO request along with foreground operations, the IO gets completed, and the FE interface completes the IO back to host. So, if more than one Core or thread requires foreground operations, they communicate in a cascaded way, perform foreground operations in parallel, and complete before informing the host that the request is complete.

There are several advantages associated with these embodiments. For example, SD products operating in a multi-protocol mode and multi-core platform to achieve high performance in one mode might create synchronization or timeout issues in other modes, especially if there are different modes with completely different operating performance requirements, such as SD and NVMe. These embodiments can help such multi-core systems synchronize better and meet time requirements of the host. That is, in multi-protocol supported products like SD Express which operate at high speed in NVMe mode, it can be difficult to perform memory maintenance operations in the foreground while operating in SD mode. Even if memory maintenance operations are performed in the foreground, there is potential to decrease performance because of delayed completions down to provide time for the memory maintenance operations. These embodiments can provide a dedicated way to perform memory maintenance operations with the assistance of the host 300. Once done, the data storage device can operate at higher speeds.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. In a data storage device comprising a memory, a method comprising:
   determining whether a set of memory maintenance operations can be performed within a time period; and
   in response to determining that the set of memory maintenance operations cannot be performed within the time period:
      throttling input-output commands received by the data storage device to allow the set of memory maintenance operations to be performed within the time period;
      performing the set of memory maintenance operations within the time period;
      operating under a first protocol in which the set of memory maintenance operations is performed as a set of background operations; and
      operating under a second protocol in which the set of memory maintenance operations is performed as a set of foreground operations;
      wherein the first protocol comprises a Non-Volatile Memory Express (NVMe) protocol and the second protocol comprises a Secure Digital (SD) protocol.

2. The method of claim 1, wherein the input-output commands are throttled by adding delays in buffering the input-output commands in a buffer in the data storage device.

3. The method of claim 1, wherein the set of memory maintenance operations are performed by a plurality of threads, and wherein the one or more processors, individually or in combination, are further configured to synchronize performance of the set of memory maintenance operations by the plurality of threads.

4. The method of claim 1, wherein the set of memory maintenance operations are performed by a plurality of processors of the one or more processors, which are synchronized.

5. The method of claim 4, wherein the plurality of processors comprises a flash translation layer core and an internal file system core.

6. The method of claim 1, wherein the set of memory maintenance operations comprises a read scrub operation, an enhanced post-write read (EPWR) operation, a single-level cell (SLC) to multi-level cell (MLC) relocation operation, an internal file system (IFS) block management operation, a wear leveling operation, or a garbage collection operation.

7. The method of claim 1, wherein the memory comprises a three-dimensional memory.

8. A data storage device comprising:
   a memory; and
   one or more processors, individually or in combination, configured to:

determine whether a set of memory maintenance operations can be performed within a time constraint; and in response to determining that the set of memory maintenance operations cannot be performed within the time constraint:

throttle host commands received by the data storage device to allow the set of memory maintenance operations to be performed within the time constraint; and perform the set of memory maintenance operations within the time constraint;

operate under a first protocol in which the set of memory maintenance operations is performed as a set of background operations; and operate under a second protocol in which the set of memory maintenance operations is performed as a set of foreground operations;

wherein the first protocol comprises a Non-Volatile Memory Express (NVMe) protocol and the second protocol comprises a Secure Digital (SD) protocol.

9. The data storage device of claim 8, wherein the host commands are throttled by adding delays in buffering the host commands in a buffer in the data storage device.

10. The data storage device of claim 8, wherein the set of memory maintenance operations are performed by a plurality of threads, and wherein the one or more processors, individually or in combination, are further configured to synchronize performance of the set of memory maintenance operations by the plurality of threads.

11. The data storage device of claim 10, wherein the plurality of threads comprises a flash translation layer thread and an internal file system thread.

12. The data storage device of claim 8, wherein the set of memory maintenance operations are performed by a plurality of processors of the one or more processors, which are synchronized.

13. The data storage device of claim 12, wherein the plurality of processors comprises a flash translation layer core and an internal file system core.

14. The data storage device of claim 8, wherein the set of memory maintenance operations comprises a read scrub operation, an enhanced post-write read (EPWR) operation, a single-level cell (SLC) to multi-level cell (MLC) relocation operation, an internal file system (IFS) block management operation, a wear leveling operation, or a garbage collection operation.

15. The data storage device of claim 8, wherein the memory comprises a three-dimensional memory.

16. A data storage device comprising:

a memory; and means for:

determining whether a set of memory maintenance operations can be performed within a time period; and in response to determining that the set of memory maintenance operations cannot be performed within the time period:

throttling input-output commands received by the data storage device to allow the set of memory maintenance operations to be performed within the time period;

performing the set of memory maintenance operations within the time period;

operating under a first protocol in which the set of memory maintenance operations is performed as a set of background operations; and operating under a second protocol in which the set of memory maintenance operations is performed as a set of foreground operations;

wherein the first protocol comprises a Non-Volatile Memory Express (NVMe) protocol and the second protocol comprises a Secure Digital (SD) protocol.

* * * * *